UNITED STATES PATENT OFFICE.

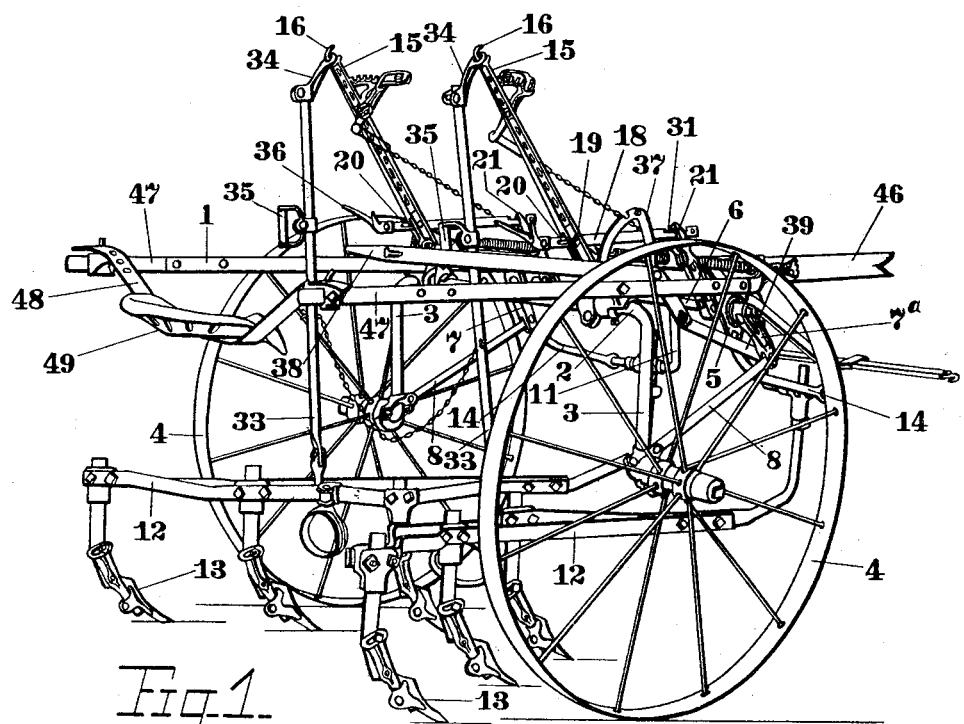

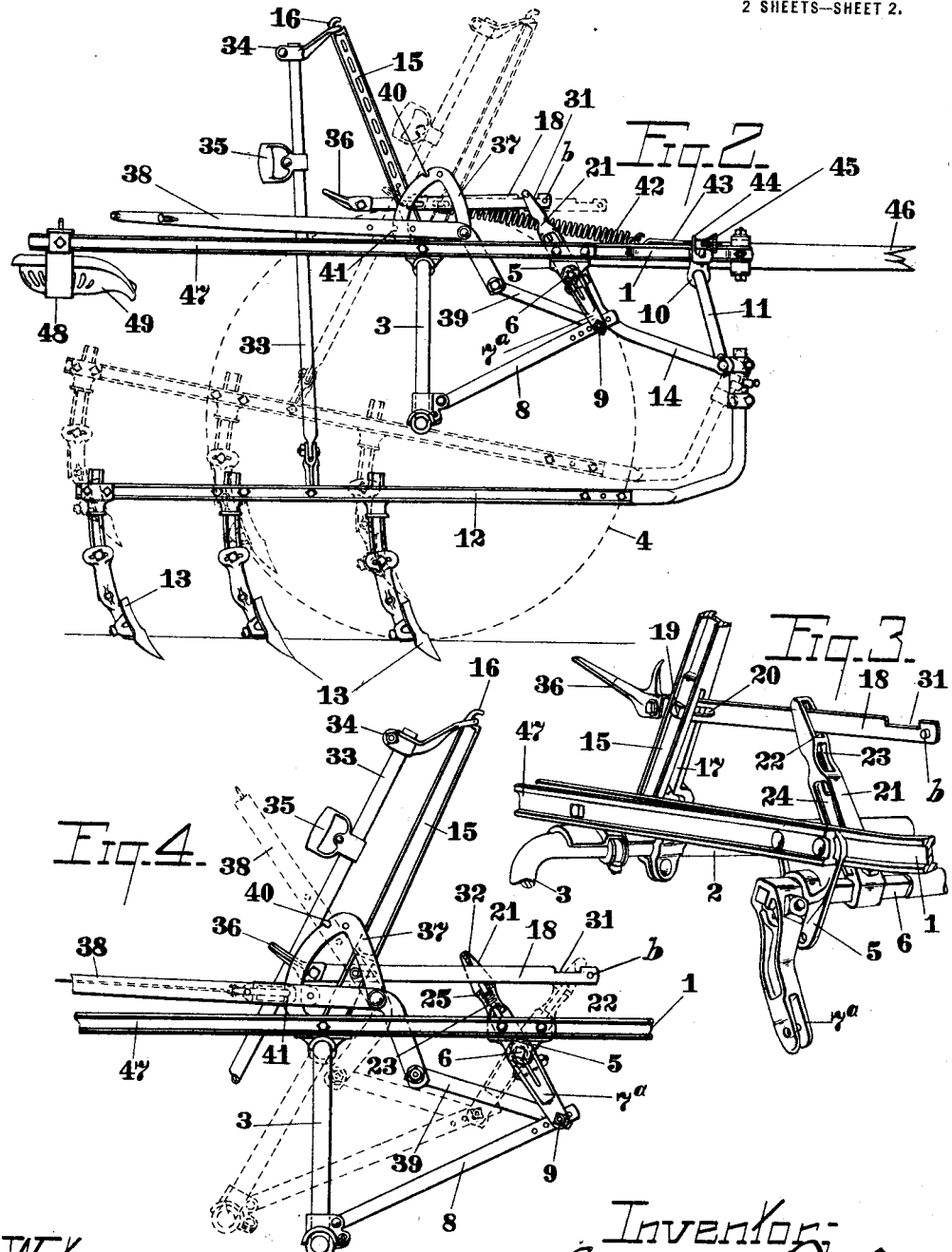

WESLEY A. PAUL, OF MOLINE, ILLINOIS, ASSIGNOR TO DEERE & COMPANY, OF MOLINE, ILLINOIS, A CORPORATION OF ILLINOIS.

CULTIVATOR.

1,181,539.  Specification of Letters Patent.  Patented May 2, 1916.

Application filed September 8, 1914. Serial No. 860,727.

*To all whom it may concern:*

Be it known that I, WESLEY A. PAUL, a citizen of the United States, residing at Moline, in the county of Rock Island and State of Illinois, have invented certain new and useful Improvements in Cultivators, of which the following is a specification, reference being had therein to the accompanying drawing.

My invention relates to wheeled cultivators and particularly to means employed for adjustment of various parts of the implement.

The object of my invention is to provide a simple and positively acting mechanism by which the cultivating rigs may be adjusted simultaneously or singly from a working to a non-operative position.

Referring to the drawings in which similar numerals indicate identical parts—Figure 1 is a perspective view of a cultivator embodying my invention. Fig. 2 is a side elevation with the wheels removed. Figs. 3, 4 and 5 are enlarged detail views.

The frame 1 is supported upon a rocking axle 2 journaled in suitable bearings on the frame 1 and having downwardly extending portions 3 on the lower ends of which are mounted wheels 4. Journaled in brackets 5 on opposite sides of the frame 1 is a rock shaft 6 having secured on each end a depending arm 7 and 7ª, the lower ends of said arms are slotted to receive links 8 which are held therein by bolts or pins 9 projected through suitable holes in the arms 7 and the links 8, several holes being provided in each link for purposes of adjustment. The links 8 extend rearwardly and are pivotally connected to the lower ends of the downwardly extending portions 3 of the axle 2.

Forwardly on the frame 1 is supported, in brackets 10, a shaft 11 having its ends cranked to support cultivating rigs, the latter comprising frames 12 pivotally attached to the crank ends of the shaft 11, and carrying earth working tools of a desired type, in this instance cultivating shovels 13 suitably secured on the frames 12. Braces 14 extend from the brackets 5 to the ends of the shaft 11 and hold the latter securely in place and at the same time sustain the backward strain of the cultivating devices when operating in the ground.

Masts 15, one for each rig, are pivotally supported on the axle 2 and have their upper ends terminating in hooks 16; in the masts, adjacent the axle 2, are slots 17 for the reception of forwardly projecting bars 18 which are retained therein by bolts 19 passing through the masts 15 and through longitudinal slots 20 in the bars 18. Projecting upwardly from the shafts 6 and rigidly secured thereon are arms 21 which are cored to provide chambers or openings 22, 23 and 24; the openings 22 and 23 are open from front to rear and are separated by a web 25 in which is a perforation 26 through which projects a bolt 27 having a shoulder 28; the lower end of the bolt 27 extends through a perforation in a web 29 separating the openings 23 and 24. A coil spring 30 on the bolt 27, between the web 29 and the shoulder 28, exerts its pressure to retain the upper end of the bolt extended into the chamber 22 and in contact with the bars 18. In the forward upper sides of the bars 18 are extended notches 31 adapted to engage with lugs 32 at the top of chambers 22 and preferably integral with the arms 21; a stop or pin $b$ on the forward end of the bars 18 prevent withdrawal of the latter from the chamber 22 in the arms 21.

Upwardly extending lifting standards 33 are pivotally connected to the cultivating rigs 12 and have secured to their upper ends castings 34 which are provided with eyes to engage with the hooks 16 on the masts 15. Each standard is furnished with the usual grip 35 by which the standards can be operated to raise or lower the cultivating rigs. On the rear ends of the bars 18 are forks 36 to receive the standards 33 when the latter are raised.

A quadrant 37 is secured on the frame 1 and pivoted forwardly on the quadrant is a master lever 38 extending downwardly from its pivot and having a link 39 connected to its downward end and extending forwardly to one of the arms 7 to which it is attached by the bolt 9. The lever 38 is provided with the ordinary latch adapted to engage with either of the notches 40 and 41 in the quadrant 37. Coiled springs 42 are connected to the masts 15 and forwardly to hook bolts 43, the latter extending through perforations in brackets 44 and having their ends threaded to engage with manually operable nuts 45 by the turning of which the tension of the springs 42 can be varied. A draft pole 46 is secured forwardly on the frame 1. A seat support is composed of bars 47, secured to the sides of the frame 1, and carrying on their rear ends a bar 48 on which is mounted a seat 49.

As shown in Fig. 1 the cultivator is in position for operation, and it is desired to raise one of the rigs to free the earth working devices from an accumulation of trash such as weeds, stalks or the like, the operator on the seat 49, having all the manually operable parts within easy reach, by means of either of the grips 35 can lift the standard 33 to which the grip is secured, and simultaneously raise the cultivating rig to which the standard is attached, and as the manual operation of raising either of the cultivating rigs is similar in both, a description of one will suffice; as the standard is connected to a mast 15 by a casting 34 the mast is rocked forwardly on its pivot on the axle 2, the forward movement being assisted by the spring 42, until the standard 33 contacts with the fork 36 on the bar 18 and the cultivating rig is held suspended, as shown in dotted lines in Fig. 2, until it is desired to lower it by hand or by means hereafter described.

The bar 18 being connected to the mast 15 by the bolt or pin 19, the bar 18 must necessarily move with the mast 15, the bar 18 passing through the chamber 22 in the arm 21, the latter held against movement by the lever 38 being retained at the lower notch in the segment 37; as the bar 18 is moved forwardly the rearward shoulder of the notch 31 is forced against the rear of the lug 32, and as the latter is now at an inclination by reason of the angular position of the arm 21, the bar 18 pushes the bolt 27 downward until the rear shoulder of the notch 31 is free to pass beneath the lug 32, so that when the mast 15 is at the limit of its forward movement the bar 18 is in the position shown in Fig. 3. By pulling upon the grip 35 the reverse of the operation just described takes place and the various parts are returned to the position shown in Fig. 1, and in full lines in Fig. 2.

The lever 38 is employed to render the machine inoperative or operative. As shown in Figs. 1 and 2 the lever 38 is held at the lower notch 41 in the quadrant 37, the machine is balanced and the rigs are in position for cultivating. To lift both rigs I move the lever 38 to the upper notch 40 in the quadrant, rocking the shaft 6 through the connection of the link 39 to the lever 38 and to the depending arm 7 rigidly secured to the shaft 6. As the depending arms 7 and 7ᵃ are rocked rearwardly by the upward movement of the lever 38, the axle 2 is also rocked by means of the links 8 connecting the arms 7 and 7ᵃ with the axle; simultaneously the arms 21 are rocked forwardly, the lugs 32 engaging with the forward shoulder of the notch 31 in the bars 18, the latter are drawn forwardly rocking the masts 15 in the same direction and lifting the standards 33 and the cultivating rigs connected thereto, the stops b holding them against rearward movement. Moving the lever 38 to the lower notch 41 in the quadrant 37 reverses the operation just described, the lugs 32 acting against the rearward shoulder of the notches 31 in the bars 18, the latter are moved rearwardly, and by reason of the slots 20 in the bars 18 pressure is first exerted upon the standards 33 which are resting in the forks 36; continued rearward movement of the bars 18 brings the forward end of the slots 20 into engagement with the bolts 19 on the masts 17 and the rearward pressure is exerted upon both the standards 33 and the masts 15 until the latter are approximately vertical when the weight of the rigs and standards will rock the masts farther rearward lowering the rigs to the ground, the downward movement of the lever 38 rocking the axle 2 to draw the wheels 4 forward to balance on the axle.

With the machine in an operative position either or both of the cultivating rigs can be raised and again lowered by hand; when the lever is employed to raise the cultivating rigs, the latter cannot be lowered except by reverse operation of the lever.

What I claim is—

1. In a cultivator, the combination of a frame, a cranked axle journaled on the frame and having supporting wheels, a rock shaft mounted transversely on the frame, depending arms secured to said shaft and connected with the axle, a lever having a connection with one of said arms to actuate the latter to swing the axle and move the wheels forwardly or rearwardly, upwardly projecting arms secured on the transverse shaft, cultivating rigs connected forwardly with the frame, means to support said rigs rearward of their connection with the frame, said supporting means operable to raise said rigs separately when the wheels are in a forward position, and connections between said supporting means and upwardly projecting arms to raise the cultivating rigs by operation of the lever simultaneously with the rearward movement of the wheels.

2. In a cultivator, the combination of a frame, a cranked axle journaled on the frame and having supporting wheels, a rock shaft mounted transversely on the frame, depending arms secured to the shaft and connected with the axle, a lever having a connection with one of said arms to swing the axle and move the wheels forwardly or rearwardly, upwardly projecting arms secured on the shaft; cultivating rigs connected forwardly with the frame, means to support the rigs rearwardly on the frame and operable to raise said rigs only when the axle is swung forwardly, means slidably connected to the support and the upwardly projecting arms and adapted to engage with the latter to hold the rigs in a raised position when the axle is rocked rearwardly.

3. In a cultivator, the combination of a frame, a cranked axle journaled on the frame and having supporting wheels, a rock shaft mounted transversely on the frame, depending arms secured to the shaft and connected with the axle, a lever having a connection with one of said arms to swing the axle to move the wheels forwardly or rearwardly and to simultaneously rock said shaft, upwardly projecting arms secured on the rock shaft and adapted to be swung in a direction opposite to the movement of the axle, cultivating rigs connected forwardly with the frame, means to support the rigs rearwardly on the frame and operable only when the axle is swung forwardly to raise the rigs independently or together, and bars slidably connected to said support and upwardly projecting arms and movable freely through openings in the latter when the axle is swung forwardly and the rigs are raised, said bars adapted to engage with said arms to hold the rigs in a raised position and to lower said rigs when the axle is rocked forwardly.

4. In a cultivator, the combination of a frame, a crank axle journaled on the frame and having supporting wheels, a rock shaft mounted transversely on the frame and having depending arms, means connecting said arms with the axle, a lever having a connection with one of said arms and adapted to actuate the latter to swing the axle and move the wheels forwardly or rearwardly, upwardly projecting arms secured on said rock shaft, cultivating rigs connected to the frame, standards mounted on the cultivating rigs, masts pivotally supported on the axles and flexibly connected to the standards, and bars slidably connected to said masts and the upwardly projecting arms to rock said masts by operating the lever only to raise or lower the cultivating rigs simultaneously with the rearward or forward movement of the wheels.

5. In a cultivator, the combination of a frame, a cranked axle journaled on the frame and having supporting wheels, cultivating rigs connected to the frame, a rock shaft mounted transversely on the frame and having depending arms connected with the axle, a lever having operative connection with one of said arms and actuable to swing the axle to move the wheels forwardly or rearwardly, upwardly projecting arms secured on the rock shaft and having an open chamber at their free ends, means supporting each cultivating rig rearward of the axle and manually operable to raise and lower said rigs separately, bars connected to the supporting means of said rigs and extending forwardly through the open chambers of the upwardly projecting arms, and means to engage said arms with said bars to raise said cultivating rigs simultaneously with the rearward movement of the wheels by operation of the lever, said bars movable freely in said arms when the cultivating rigs are manually raised while the wheels are in a forward position.

6. In a cultivator, the combination of a frame, a cranked axle journaled on the frame and having supporting wheels, cultivating rigs connected to the frame, a rock shaft mounted transversely on the frame and having depending arms connected with the axle, a lever having operative connection with one of said arms and actuable to swing the axle to move the wheels forwardly or rearwardly, upwardly projecting arms secured on the rock shaft and having an open chamber at their free ends, means supporting each cultivating rig rearward of the axle and manually operable to raise and lower said rigs separately, bars connected to the supporting means of said rigs and extending forwardly through the open chambers of the upwardly projecting arms, said chambers having lugs engaging with notches in said bars, and spring bolts in said arms to hold the bars therein in engagement with said lugs when the wheels are moved rearwardly, said bars and lugs adapted to be disengaged when the wheels are in a forward position and the cultivating rigs are manually operated.

In testimony whereof I affix my signature, in presence of two witnesses.

WESLEY A. PAUL.

Witnesses:
 JESSIE SIMSER,
 W. G. DUFFIELD.